(12) United States Patent
Wang (10) Patent No.: US 10,857,843 B2
(45) Date of Patent: Dec. 8, 2020

(54) PNEUMATIC TIRE

(71) Applicant: The Yokohama Rubber Co., LTD., Tokyo (JP)

(72) Inventor: Chunyi Wang, Hiratsuka (JP)

(73) Assignee: The Yokohama Rubber Co., LTD.

( * ) Notice: Subject to any disclaimer, the term of this patent is extended or adjusted under 35 U.S.C. 154(b) by 325 days.

(21) Appl. No.: 15/117,709

(22) PCT Filed: Dec. 24, 2014

(86) PCT No.: PCT/JP2014/084153
§ 371 (c)(1),
(2) Date: Aug. 9, 2016

(87) PCT Pub. No.: WO2015/133043
PCT Pub. Date: Sep. 11, 2015

(65) Prior Publication Data
US 2017/0021679 A1    Jan. 26, 2017

(30) Foreign Application Priority Data

Mar. 6, 2014  (JP) .................................. 2014-044319

(51) Int. Cl.
*B60C 15/06* (2006.01)
*B60C 15/00* (2006.01)

(52) U.S. Cl.
CPC ...... *B60C 15/0603* (2013.01); *B60C 15/0009* (2013.01); *B60C 15/0607* (2013.01);
(Continued)

(58) Field of Classification Search
CPC ..... B60C 15/00; B60C 15/0009; B60C 15/06; B60C 2015/0617; B60C 15/0628;
(Continued)

(56) References Cited

U.S. PATENT DOCUMENTS 4,046,183 A    9/1977  Takahashi et al.
4,265,292 A *  5/1981  Inoue .................. B60C 15/0027
152/543
(Continued)

FOREIGN PATENT DOCUMENTS

EP         810106    * 12/1997
EP       1 201 464      5/2002
(Continued)

OTHER PUBLICATIONS

Machine translation of JP 2006-168500, 2006.*
(Continued)

*Primary Examiner* — Justin R Fischer
(74) *Attorney, Agent, or Firm* — Thorpe North & Western (57) ABSTRACT

The pneumatic tire comprises a pair of bead cores, a pair of bead fillers disposed outward of the pair of bead cores in a tire radial direction, a carcass layer disposed folded around the bead cores and the bead fillers, and a steel chafer including an arranged plurality of steel cords, the steel chafer being disposed between the carcass layer and a rim engaging surface. A height Hs of an outer end portion of the steel chafer located outward of the bead fillers in a tire width direction and a rim flange height Hf have the relationship: $0.5 \leq Hs/Hf \leq 1.0$, where the height is measured from a measuring position of a rim diameter.

18 Claims, 4 Drawing Sheets

(52) U.S. Cl.
CPC ............... *B60C 2015/0614* (2013.01); *B60C 2015/0617* (2013.01); *B60C 2015/0621* (2013.01); *B60C 2015/0667* (2013.01); *B60C 2015/0692* (2013.01); *B60C 2200/06* (2013.01)

(58) Field of Classification Search
CPC ............ B60C 15/0635; B60C 15/0653; B60C 2015/066; B60C 2015/0664
See application file for complete search history.

(56) References Cited

U.S. PATENT DOCUMENTS

| | | | | |
|---|---|---|---|---|
| 5,131,447 | A | * | 7/1992 | Nakagawa ............... B60C 15/06 152/543 |
| 5,458,175 | A | * | 10/1995 | Matsuura ............ B60C 15/0236 152/454 |
| 5,460,214 | A | * | 10/1995 | Fujita .................... B60C 15/024 152/540 |
| 6,044,885 | A | * | 4/2000 | Kato ........................ B60C 3/04 152/540 |
| 9,975,385 | B2 | * | 5/2018 | Sugiyama ........... B60C 15/0635 |
| 2001/0000388 | A1 | | 4/2001 | Corsi |
| 2002/0153080 | A1 | | 10/2002 | Yamaguchi |
| 2013/0037196 | A1 | | 2/2013 | Kodama |

FOREIGN PATENT DOCUMENTS

| | | | |
|---|---|---|---|
| GB | 1091507 | * | 8/1974 |
| JP | 2001-225618 | * | 8/2001 |
| JP | 2002-517347 | | 6/2002 |
| JP | 2002-219913 | | 8/2002 |
| JP | 2004-345414 | | 12/2004 |
| JP | 2006-168500 | | 6/2006 |
| JP | 2007-145272 | | 6/2007 |
| JP | 2008-285068 | | 11/2008 |
| JP | 2013-035407 | | 2/2013 |
| JP | 2012-25296 | * | 2/2019 |
| WO | WO 1979/00976 | | 11/1979 |
| WO | WO 1999/64259 | | 12/1999 |

OTHER PUBLICATIONS

Machine translation of JP 2001-225618, 2001.*
Machine translation of JP 2012-25296, 2012.*
International Search Report for International Application No. PCT/JP2014/084153 dated Mar. 31, 2015, 4 pages, Japan.

* cited by examiner

|  | Conventional Example 1 | Conventional Example 2 | Working Example 1 | Working Example 2 | Working Example 3 | Working Example 4 | Working Example 5 | Working Example 6 | Working Example 7 |
|---|---|---|---|---|---|---|---|---|---|
| Hs/Hf | 1.2 | 1.2 | 1.0 | 0.7 | 0.5 | 0.7 | 0.7 | 0.7 | 0.7 |
| Buffer rubber? | Absent | Present | Present | Present | Present | Present | Present | Present | Present |
| Hc/Hf | 0.4 | 0.4 | 1.0 | 0.6 | 0.8 | 0.4 | 0.4 | 0.4 | 0.4 |
| Hs - Hc (mm) | 60 | 60 | 20 | 40 | 30 | 45 | 45 | 45 | 45 |
| G (mm) | 0 | 5.0 | 1.0 | 3.0 | 2.0 | 4.0 | 6.0 | 6.0 | 6.0 |
| Buffer rubber modulus at 100% elongation (MPa) | 4.2 | 4.2 | 4.2 | 4.2 | 4.2 | 4.2 | 4.2 | 1.9 | 1.9 |
| Nylon Chafer? | Absent | Absent | Absent | Absent | Absent | Absent | Absent | Absent | Present |
| Edge separation resistance performance | 100 | 102 | 104 | 108 | 105 | 110 | 112 | 116 | 120 |

FIG. 4

PNEUMATIC TIRE

TECHNICAL FIELD

The present technology relates to a pneumatic tire, and more particularly relates to a pneumatic tire with reduced separation of the peripheral rubber at the outer end portion of the steel chafer and improved tire durability.

BACKGROUND ART

Conventional heavy duty radial tires are provided with steel chafers, which include steel cords, on the rim engaging portions of the carcass layer to protect the carcass layer and to reduce or prevent air permeation via the rim engaging portion. The technologies described in Japanese Unexamined Patent Application Publication Nos. 2002-517347 and 2013-35407 are known conventional pneumatic tires using such a configuration.

Configurations provided with such a steel chafer tend to suffer from separation of the peripheral rubber at the outer end portion of the steel chafer (the end portion located outward of the bead filler in the tire width direction).

SUMMARY

The present technology provides a pneumatic tire with reduced separation of the peripheral rubber at the outer end portion of the steel chafer and improved tire durability.

A pneumatic tire according to the present technology comprises:
a pair of bead cores;
a pair of bead fillers disposed outward of the pair of bead cores in a tire radial direction;
a carcass layer disposed folded around the bead cores and the bead fillers;
a steel chafer including an arranged plurality of steel cords, the steel chafer being disposed between the carcass layer and a rim engaging surface.

In such a pneumatic tire,
a height Hs of an outer end portion of the steel chafer located outward of the bead fillers in a tire width direction and a rim flange height Hf have the relationship: $0.5 \leq Hs/Hf \leq 1.0$, where the height is measured from a measuring position of a rim diameter.

The pneumatic tire according to the present technology has an appropriate height Hs of the outer end portion of the steel chafer. In particular, when Hs/Hf is equal to or less than 1.0, the outer end portion of the steel chafer is supported between the rim and the carcass layer, when the tire is assembled on the rim. As a result, strain of the peripheral rubber at the outer end portion of the steel chafer is minimized or prevented, and thus separation of the peripheral rubber at the outer end portion is minimized or prevented.

DETAILED DESCRIPTION

An embodiment of the present technology is described in detail below, with reference to the accompanying drawings. However, the technology is not limited to this embodiment. In addition, the components of the embodiment include components that are replaceable while maintaining consistency of the technology, and obviously replaceable components. Furthermore, a plurality of modified examples described in the embodiment may be freely combined within the scope of obviousness to a person skilled in the art.

Pneumatic Tire

Figure 1:
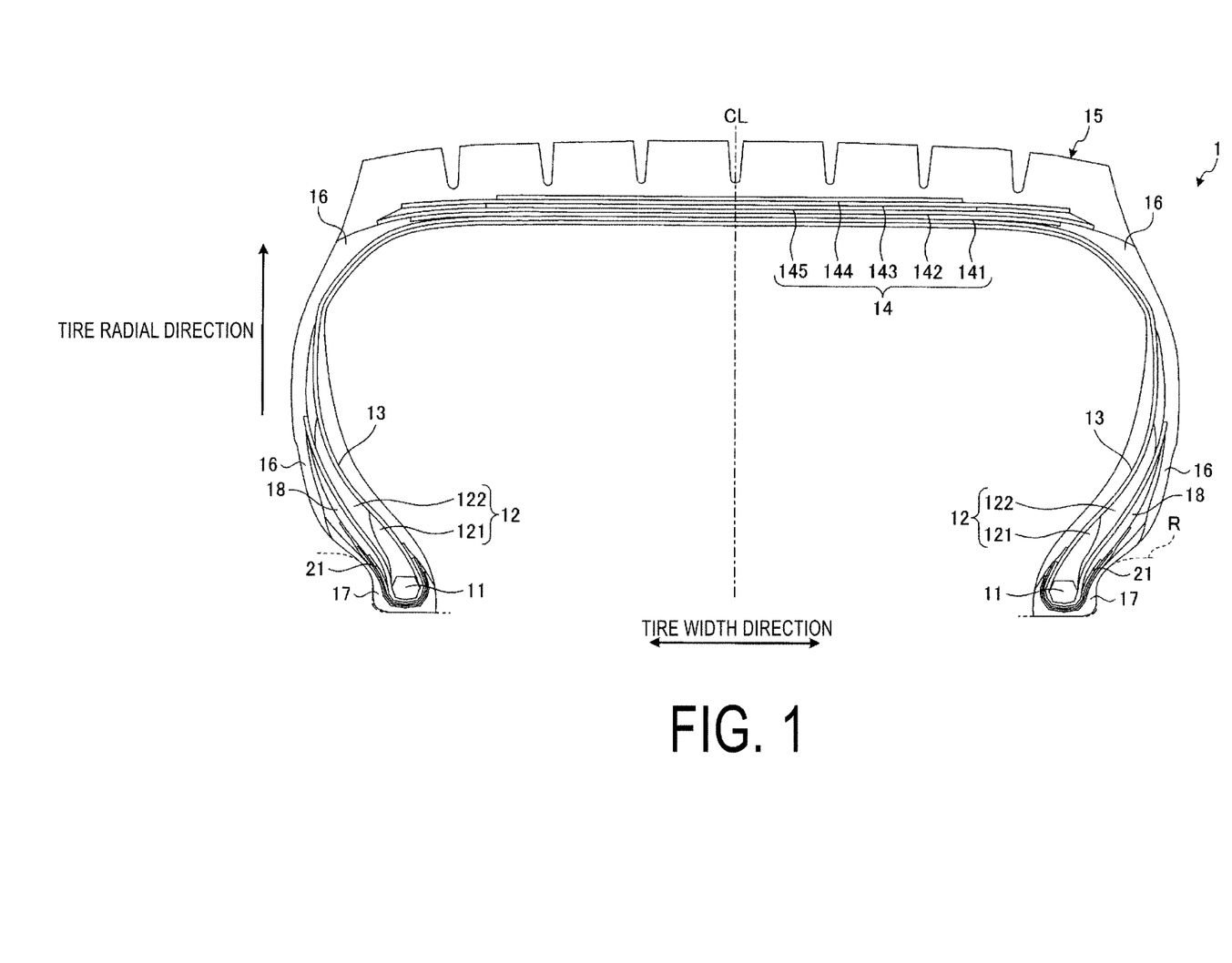
FIG. 1 is a cross-sectional view taken along a tire meridian direction illustrating a pneumatic tire according to an embodiment of the present technology.

FIG. 1 is a cross-sectional view taken along a tire meridian direction illustrating a pneumatic tire according to an embodiment of the present technology. FIG. 1 is a cross-sectional view of a region to one side of the pneumatic tire in the tire radial direction. FIG. 1 illustrates a heavy duty radial tire mounted on a truck, bus, or the like for long-distance transport as an example of the pneumatic tire.

In the descriptions for FIG. 1, "cross section taken along the tire meridian direction" refers to a cross section of the tire taken along a plane that includes the tire rotational axis (not illustrated). Reference sign "CL" denotes the tire equatorial plane. "Tire equatorial plane" refers to a plane orthogonal to the tire rotational axis which passes through the center point of the tire in the tire rotational axis direction. Additionally, "tire width direction" refers to a direction parallel to the tire rotational axis. "Tire radial direction" refers to a direction orthogonal to the tire rotational axis.

Pneumatic tire 1 has an annular structure with the tire rotational axis as its center. The pneumatic tire 1 is provided with a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The bead cores 11, 11 have an annular structure and include a plurality of bead wires bundled together. The bead cores 11, 11 constitute the cores of the left and right bead portions. Each of the bead fillers 12, 12 includes a lower filler 121 and an upper filler 122. The bead fillers 12, 12 are disposed on the outer circumference of the bead cores 11, 11 in the tire radial direction and constitute bead portions.

The carcass layer 13 extends between the left and right bead cores 11, 11 in a toroidal form, forming the framework for the tire. In addition, each edge portion of the carcass layer 13 is folded from the inner side in the tire width direction to the outer side in the tire width direction and fixed so as to fold around the bead core 11 and bead filler 12. Also, the carcass layer 13 is constituted by a plurality of carcass cords, each made of steel or an organic fiber material (e.g., nylon, polyester, rayon, or the like), covered by a coating rubber and subjected to a rolling process. The carcass layer 13 has a carcass angle (angle of inclination of the fiber direction of the carcass cords with respect to the tire circumferential direction), as an absolute value, of from 85 degrees to 95 degrees. Note that in the configuration illustrated in FIG. 1, the carcass layer 13 is a single layer structure made of a single carcass ply. However, without being limited as such, the carcass layer 13 may have a multi-layer structure of layered carcass plies (not illustrated).

The belt layer 14 includes layered belt plies 141 to 145, and is disposed wound around the outer circumference of the carcass layer 13. These belt plies 141 to 145 are constituted by, for example, a large angle belt 141, a pair of cross belts 142 and 143, a belt cover 144, and a circumferential reinforcing layer 145. Additionally, the belt plies 141 to 145 are constituted by a plurality of belt cords, each made of coating-rubber-coated steel or an organic fiber material, subjected to a rolling process. The belt plies 141 to 145 have a predetermined belt angle (angle of inclination of the fiber direction of the belt cords with respect to the tire circumferential direction).

The tread rubber 15 is disposed on the outer circumference of the carcass layer 13 and the belt layer 14 in the tire radial direction and constitutes a tread portion. The sidewall rubbers 16, 16 are disposed outward of the carcass layer 13 in the tire width direction. The sidewall rubbers 16, 16 constitute left and right sidewall portions. The rim cushion rubbers 17, 17 are disposed inward of the left and right bead cores 11, 11 and the folded portion of the carcass layer 13 in the tire radial direction. The rim cushion rubbers 17, 17 constitute the contact surface of the left and right bead portions with the rim flange.

Chafer

Conventional heavy duty radial tires are provided with steel chafers, which include steel cords, on the rim engaging portions of the carcass layer to protect the carcass layer and to reduce or prevent air permeation via the rim engaging portion.

However, configurations provided with such a steel chafer tend to suffer from separation of the peripheral rubber at the outer end portion of the steel chafer (the end portion located outward of the bead filler in the tire width direction).

Accordingly, the pneumatic tire 1 employs the following configuration to minimize or prevent the separation of the peripheral rubber at the outer end portion of the steel chafer.

Figure 2:
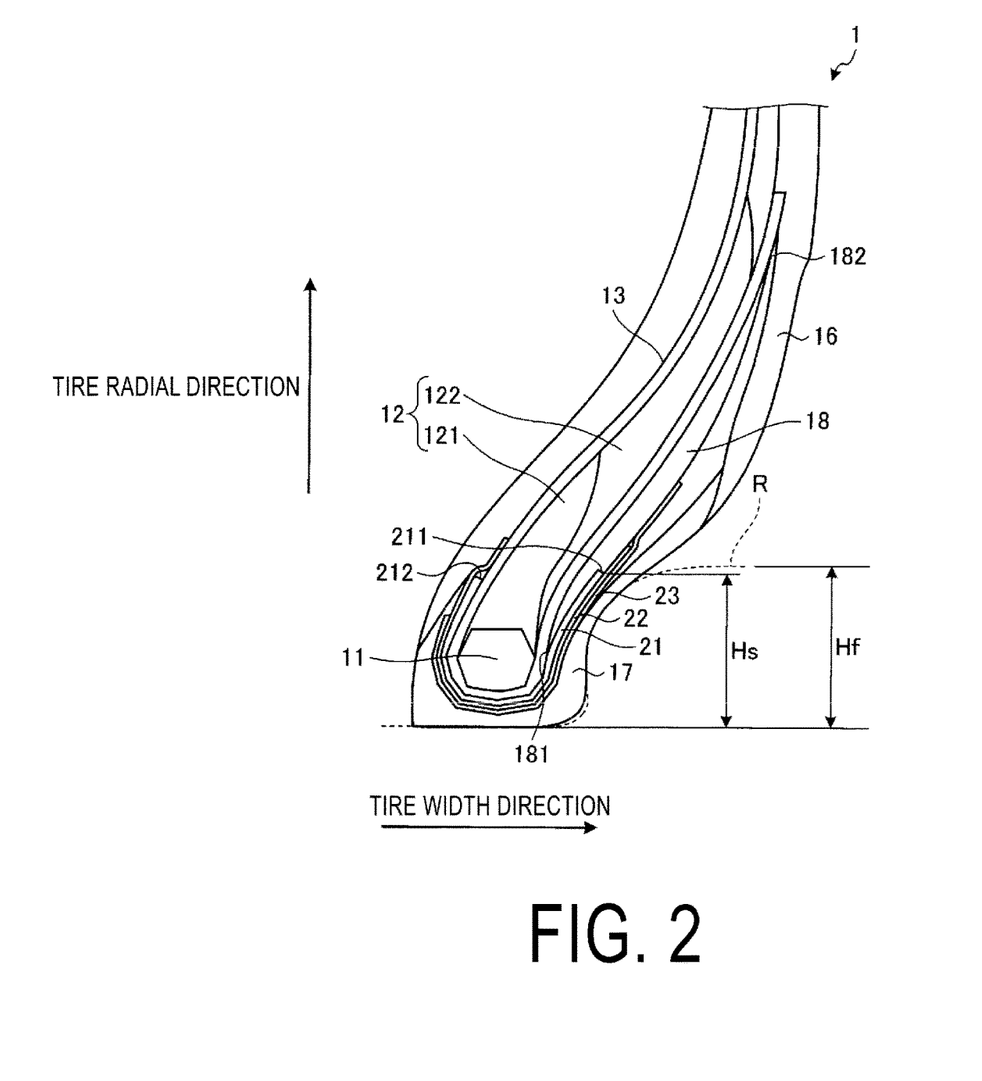
FIG. 2 is an enlarged cross-sectional view illustrating the bead portion of the pneumatic tire illustrated in FIG. 1.
Figure 3:
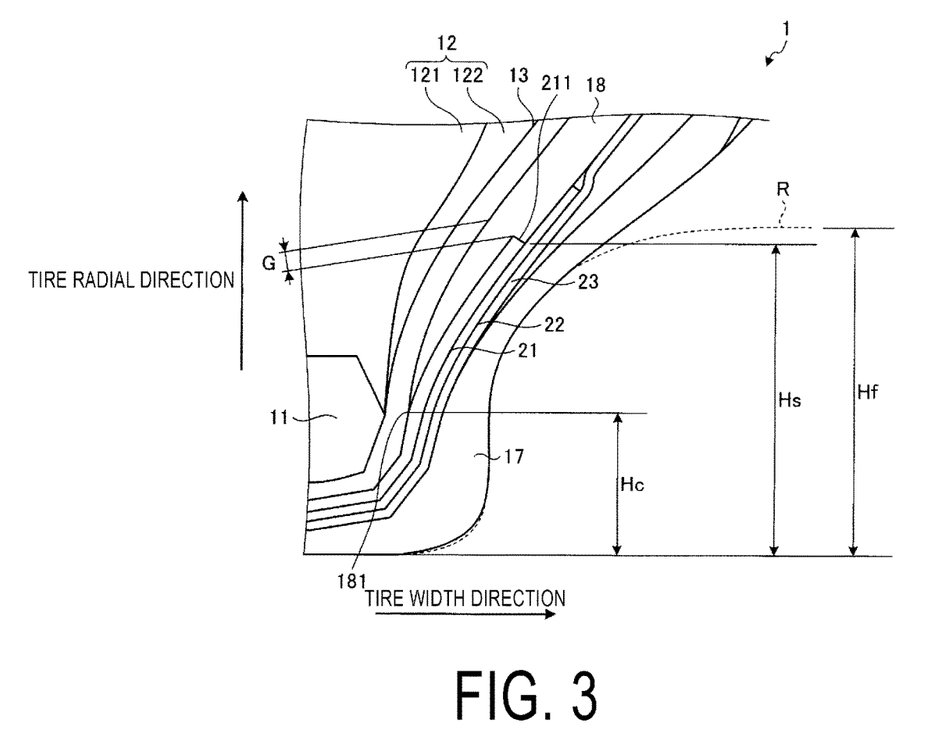
FIG. 3 is an enlarged cross-sectional view of the bead portion illustrated in FIG. 2.

FIG. 2 is an enlarged cross-sectional view illustrating the bead portion of the pneumatic tire illustrated in FIG. 1. FIG. 3 is an enlarged cross-sectional view of the bead portion illustrated in FIG. 2. These drawings are enlarged cross-sectional views of one of the pair of left and right bead portions.

As illustrated in FIG. 2, the pneumatic tire 1 is provided with a steel chafer 21 constituted by at least one layer.

The steel chafer 21 is a reinforcing layer disposed on the rim engaging portion of the tire to protect the carcass layer 13. The steel chafer 21 is constituted by, for example, a sheet-like member made by arranging and subjecting to a rolling process a plurality of steel cords, fabric woven from a plurality of steel cords, a composite material of rubberized such sheet-like members or fabric, or the like.

For example, in the configuration illustrated in FIG. 2, the single carcass layer 13 is wound up and around the bead core 11 from inside to outside in the tire width direction and fixed. The single steel chafer 21 is disposed between the carcass layer 13 and the rim engaging surface and extends conforming to the carcass layer 13. The steel chafer 21 is disposed uniformly around the entire circumference of the tire. The steel chafer 21 is wound up together with the carcass layer 13, surrounding the wound up portion of the carcass layer 13 from the inner side in the tire radial direction. The wound up end portion of the steel chafer 21 located inward in the tire width direction extends outward in the tire radial direction side by side with the carcass layer 13 and is located further outward in the tire radial direction than the bead core 11. The wound up end portion of the steel chafer 21 located outward in the tire width direction extends outward in the tire radial direction together with the wound up portion of the carcass layer 13 and is located further outward in the tire radial direction than the bead core 11.

When the tire of such a configuration is assembled on a rim, the steel chafer 21 is located between the carcass layer 13 and the rim flange and protects the carcass layer 13. Thus, air permeation via the rim engaging portion is minimized or prevented.

Here, when viewed in a cross section taken along the tire meridian direction (see FIG. 2), the steel chafer 21 has left and right end portions, and the end portion 211 located outward of the bead filler 12 in the tire width direction is referred to as the "outer end portion", and the end portion 212 located inward in the tire width direction is referred to as the "inner end portion".

The height Hs of the outer end portion 211 of the steel chafer 21 and the rim flange height Hf of the rim R have the relationship: $0.5 \leq Hs/Hf \leq 1.0$, where the height is measured from the measuring position of the rim diameter (see FIG. 2 and FIG. 3). The ratio Hs/Hf is preferably in the range: $0.6 \leq Hs/Hf \leq 0.8$.

The height Hs of the end portion of the steel chafer 21 is measured when the tire is assembled on a specified rim, inflated to the specified internal pressure, and is in an unloaded state.

The rim flange height Hf is the difference in height between the maximum diameter of the rim flange portion of the specified rim and the rim diameter.

Herein, "specified rim" refers to an "applicable rim" defined by the Japan Automobile Tyre Manufacturers Association (JATMA), a "design rim" defined by the Tire and Rim Association (TRA), or a "measuring rim" defined by the European Tyre and Rim Technical Organization (ETRTO). "Specified internal pressure" refers to "maximum air pressure" defined by JATMA, a maximum value in "tire load limits at various cold inflation pressures" defined by TRA, and "inflation pressures" defined by ETRTO. Additionally, "specified load" refers to "maximum load capacity" defined by JATMA, a maximum value in "tire load limits at various cold inflation pressures" defined by TRA, and "load capacity" defined by ETRTO. However, according to JATMA, for a passenger vehicle tire, the specified internal pressure is an air pressure of 180 kPa, and a specified load is 88% of maximum load capacity.

Such a configuration with Hs/Hf equal to or greater than 0.5 ensures a suitable height Hs for the steel chafer 21, and thus the steel chafer 21 provides appropriate reinforcement. In a configuration with Hs/Hf equal to or less than 1.0, the outer end portion 211 of the steel chafer 21 is supported between the rim R and the carcass layer 13, when the tire is assembled on the rim. As a result, strain of the peripheral rubber at the outer end portion 211 of the steel chafer 21 is minimized or prevented, and thus separation of the peripheral rubber at the outer end portion 211 is minimized or prevented.

Note that the steel chafer 21 of the configuration illustrated in FIG. 2 is constituted by steel cords preferably having a diameter of from 1.0 mm to 3.0 mm, both inclusive. The angle formed by the longitudinal direction of the steel cords and the tire radial direction is preferably from 50 degrees to 75 degrees, both inclusive, and more preferably from 60 degrees to 70 degrees, both inclusive. The density at which the steel cords are disposed per 5 cm width of steel chafer 21 is preferably from 10 cords/5 cm to 40 cords/5 cm, both inclusive, and more preferably from 20 cords/5 cm to 30 cords/5 cm, both inclusive. By satisfying these ranges, the steel chafer 21 is ensured appropriate strength.

In the configuration illustrated in FIG. 2, the inner end portion 212 of the steel chafer 21 extends inward of the bead filler 12 in the tire width direction and outward of the bead core 11 in the tire radial direction. The steel chafer 21 of such a configuration extends across the entire rim engaging surface, and thus the steel chafer 21 provides suitable reinforcement.

However, the configuration is not limited thereto, and the inner end portion 212 of the steel chafer 21 may be located further down from where it is located in the configuration illustrated in FIG. 2. Accordingly, the steel chafer 21 may extend in a smaller range (not illustrated). In such a case, as long as the inner end portion 212 of the steel chafer 21 is located at least in the region outward from the center of gravity of the bead core 11 in the tire width direction and inward of the center of gravity of the bead core 11 in the tire radial direction, the steel chafer 21 can provide appropriate reinforcement. The steel chafer 21 preferably extends from the region outward of the bead filler 12 in the tire width direction to the region inward from the center of gravity of the bead core 11 in the tire width direction.

In the configuration illustrated in FIG. 2, a single steel chafer 21 is disposed. However, the steel chafer 21 is not limited thereto, and a layered plurality of steel chafers 21 may be disposed (not illustrated).

Buffer Rubber

The pneumatic tire 1 of the configuration illustrated in FIG. 2 is provided with a buffer rubber 18. The buffer rubber 18 is disposed between the carcass layer 13 and the outer end portion 211 of the steel chafer 21. In such a configuration with the buffer rubber 18 disposed between the carcass layer 13 and the outer end portion 211 of the steel chafer 21, strain of the peripheral rubber at the outer end portion 211 of the steel chafer 21 is alleviated (buffering by the buffer rubber 18). Accordingly, separation of the peripheral rubber is minimized or prevented.

For example, in the configuration illustrated in FIG. 2, the single carcass layer 13 is wound up and around the bead core 11 from inside to outside in the tire width direction and fixed. The buffer rubber 18 is disposed outward of the wound up portion of the carcass layer 13 in the tire width direction, and extends in the tire radial direction conforming to the wound up portion of the carcass layer 13. The buffer rubber 18 is disposed uniformly around the entire circumference of the tire. The end of the buffer rubber 18 inward in the tire radial direction is disposed between the wound up portion of the carcass layer 13 and the outer end portion 211 of the steel chafer 21. Accordingly, the buffer rubber 18 is disposed between the carcass layer 13 and the outer end portion 211 of the steel chafer 21, separating the two.

In FIG. 3, the height Hc of the inner end portion 181 of the buffer rubber 18 in the tire radial direction and the rim flange height Hf preferably have the relationship: Hc/Hf≤0.4, and more preferably the relationship: Hc/Hf≤0.3, where the height is measured from the measuring position of the rim diameter. By satisfying these relationships, the buffer rubber 18 is ensured to extend in an appropriate range along the rim engaging portion, and thus appropriate buffering by the buffer rubber 18 is obtained. Note that in the configuration illustrated in FIG. 2, the inner end portion 181 of the buffer rubber 18 in the tire radial direction extends to the side of the bead core 11.

The minimum value for the ratio Hc/Hf is not limited to a particular value, however it is subject to restrictions in relation to the difference Hs–Hc described below.

The position of the outer end portion 182 of the buffer rubber 18 in the tire radial direction is not limited to a particular position, and may be any position providing the position is outward from the position of the rim flange height Hf in the tire radial direction. However, a buffer rubber 18 with an excessively large volume increases the rolling resistance of the tire and is thus not preferable.

The height Hc of the end portion 181 of the buffer rubber 18 is measured when the tire is assembled on a specified rim, inflated to the specified internal pressure, and is in an unloaded state.

In FIG. 3, the difference Hs–Hc between the height Hs of the outer end portion 211 of the steel chafer 21 and the height Hc of the inner end portion 181 of the buffer rubber 18 in the tire radial direction is preferably in the range: 45 mm≤Hs–Hc. By satisfying this range, the buffer rubber 18 is ensured to extend in an appropriate range in reference to the outer end portion 211 of the steel chafer 21, and thus appropriate buffering by the buffer rubber 18 is obtained.

The maximum value for the difference Hs–Hc is not limited to a particular value, however it is subject to restrictions in relation to the ratio Hc/Hf described above.

In FIG. 3, the rubber gauge G from the carcass layer 13 to the outer end portion 211 of the steel chafer 21 is preferably in the range: 5.0 mm≤G. By satisfying this range, a suitable rubber gauge Gin the vicinity of the outer end portion 211 of the steel chafer 21 is ensured, and thus appropriate buffering by the buffer rubber 18 is obtained.

The maximum value of the rubber gauge G is not limited to any particular value, however a buffer rubber 18 with an excessively large volume increases the rolling resistance of the tire and is thus not preferable.

The rubber gauge G is taken as the thickness of the rubber member between the carcass cords of the carcass layer 13 and the most outward steel cord of the steel chafer 21 in the tire radial direction, when viewed as a cross-section taken along the tire meridian direction. Rubber members taken into consideration in the measurement of the rubber gauge G include not only the buffer rubber 18, but also the coating rubber of the carcass layer 13, the coating rubber of the steel chafer 21, and the like.

In the configuration illustrated in FIG. 2, the buffer rubber 18 preferably has a modulus at 100% elongation of from 2.0 MPa to 4.0 MPa, both inclusive, and more preferably from 2.3 MPa to 3.2 MPa, both inclusive. By satisfying these ranges, the buffer rubber 18 is given appropriate physical properties, and thus appropriate buffering by the buffer rubber 18 is obtained.

The modulus of the buffer rubber 18 is measured by a tensile test at room temperature in accordance with JIS (Japanese Industrial Standard) K6251 (using No. 3 dumbbells).

Sub-Chafer

The pneumatic tire 1 of the configuration illustrated in FIG. 2 is provided with sub-chafers 22, 23. The sub-chafers 22, 23 are supplementary reinforcing layers disposed covering the outer end portion 211 of the steel chafer 21 from the outer side in the tire width direction. Additionally, the sub-chafers 22, 23 are made of organic fiber material (such as nylon, polyester, rayon, and the like) and are constituted by, for example, sheet-like members made by arranging and subjecting to a rolling process a plurality of organic fiber cords, fabric woven from a plurality of organic fiber cords, a composite material of rubberized such sheet-like members or fabric, or the like.

In the configuration illustrated in FIG. 2 for example, the sub-chafers 22, 23 are disposed between the steel chafer 21 and the rim cushion rubber 17 and extend conforming to the steel chafer 21. The sub-chafers 22, 23 are disposed uniformly around the entire circumference of the tire. The sub-chafers 22, 23 are wound up together with the steel chafer 21, covering the entire region of the steel chafer 21 from the inner side in the tire radial direction. In addition, at least one of the sub-chafers 22, 23 extends outward beyond the outer end portion 211 and inner end portion 212 of the steel chafer 21 in the tire radial direction. Accordingly, the outer end portion 211 and the inner end portion 212 of the steel chafer 21 are securely covered by the sub-chafers 22, 23. The end portions 211, 212 of the steel chafer 21 and the end portions of the sub-chafers 22, 23 are all disposed at different positions. As a result, stress concentration at the position of the end portions of the chafers is alleviated.

In such a configuration, the sub-chafers 22, 23 cover the outer end portion 211 and the inner end portion 212 of the steel chafer 21. Thus, movement of the end portions 211, 212 of the steel chafer 21 when the tire is rolling is minimized or prevented. This minimizes or prevents strain of the peripheral rubber at the end portions 211, 212 of the steel chafer 21, and thus separation of the peripheral rubber is minimized or prevented.

Effect

As described above, the pneumatic tire 1 is provided with the pair of bead cores 11, 11, the pair of bead fillers 12, 12 disposed outward of the pair of bead cores 11, 11 in the tire radial direction, the carcass layer 13 disposed folded around the bead core 11 and the bead filler 12, and the steel chafer 21, which includes an arranged plurality of steel cords, disposed between the carcass layer 13 and the rim engaging surface (see FIG. 1). The height Hs of the outer end portion 211 of the steel chafer 21 located outward of the bead filler 12 in the tire width direction and the rim flange height Hf have the relationship: $0.5 \leq Hs/Hf \leq 1.0$, where the height is measured from the measuring position of the rim diameter (see FIG. 2 and FIG. 3).

Such a configuration has an appropriate height Hs of the outer end portion 211 of the steel chafer 21. In other words, when Hs/Hf is equal to or greater than 0.5, a suitable height Hs of the steel chafer 21 is ensured, and thus the steel chafer 21 provides appropriate reinforcement. When Hs/Hf is equal to or less than 1.0, the outer end portion 211 of the steel chafer 21 is supported between the rim R and the carcass layer 13, when the tire is assembled on the rim. As a result, strain of the peripheral rubber at the outer end portion 211 of the steel chafer 21 is minimized or prevented, and thus separation of the peripheral rubber at the outer end portion 211 is minimized or prevented.

The pneumatic tire 1 is provided with the buffer rubber 18 disposed between the carcass layer 13 and the outer end portion 211 of the steel chafer 21 (see FIG. 2). The height Hc of the inner end portion 181 of the buffer rubber 18 in the tire radial direction and the rim flange height Hf have the relationship: $Hc/Hf \leq 0.4$, where the height is measured from the measuring position of the rim diameter (see FIG. 3). By satisfying this relationship, the buffer rubber 18 is ensured to extend in an appropriate range along the rim engaging portion, and thus appropriate buffering by the buffer rubber 18 is obtained.

In the pneumatic tire 1, the difference Hs–Hc between the height Hs of the outer end portion 211 of the steel chafer 21 and the height Hc of the inner end portion 181 of the buffer rubber 18 in the tire radial direction is in the range: 45 mm$\leq$Hs–Hc (see FIG. 3). By satisfying this range, the buffer rubber 18 is ensured to extend in an appropriate range in reference to the outer end portion 211 of the steel chafer 21, and thus appropriate buffering by the buffer rubber 18 is obtained.

In the pneumatic tire 1, the rubber gauge G from the carcass layer 13 to the outer end portion 211 of the steel chafer 21 is in the range: 5.0 mm$\leq$G (see FIG. 3). By satisfying this range, a suitable rubber gauge G in the vicinity of the outer end portion 211 of the steel chafer 21 is ensured, and thus appropriate buffering by the buffer rubber 18 is obtained.

In the pneumatic tire 1, the steel cords that constitute the steel chafer 21 have a diameter of from 1.0 mm to 3.0 mm, both inclusive, the angle formed by the longitudinal direction of the steel cords and the tire radial direction is from 50 degrees to 75 degrees, both inclusive, and the density at which the steel cords are disposed is from 10 cords/5 cm to 40 cords/5 cm, both inclusive. By satisfying these ranges, the steel chafer 21 is ensured appropriate strength.

In the pneumatic tire 1, the buffer rubber 18 has a modulus at 100% elongation of from 2.0 MPa to 4.0 MPa, both inclusive. By satisfying this range, the buffer rubber 18 is given appropriate physical properties. In other words, when the buffer rubber 18 has a modulus at 100% elongation of 4.0 MPa or less, appropriate buffering by the buffer rubber 18 is obtained.

The pneumatic tire 1 is provided with the sub-chafers 22, 23 made of organic fiber material and disposed covering the outer end portion 211 of the steel chafer 21 from the outer side in the tire width direction (see FIG. 2). The sub-chafers 22, 23 of such a configuration cover the outer end portion 211 of the steel chafer 21. As a result, movement of the outer end portion 211 of the steel chafer 21 when the tire is rolling is minimized or prevented, and thus separation of the peripheral rubber is minimized or prevented.

The steel chafer 21 of the pneumatic tire 1 extends from the region outward of the bead filler 12 in the tire width direction to the region inward from the center of gravity of the bead core 11 in the tire width direction (see FIG. 2). The steel chafer 21 of such a configuration extends across the entire rim engaging surface, and thus the steel chafer 21 provides suitable reinforcement.

(Target of Application)

It is preferable that the pneumatic tire 1 have application to a heavy duty tire. A heavy duty tire has a greater load under use than a passenger car tire. Accordingly, separation of the peripheral rubber tends to occur at the outer end portion of the steel chafer. As such, application of the pneumatic tire 1 to a heavy duty tire can provide significant minimization or prevention of the separation of the peripheral rubber.

EXAMPLES

Figure 4:
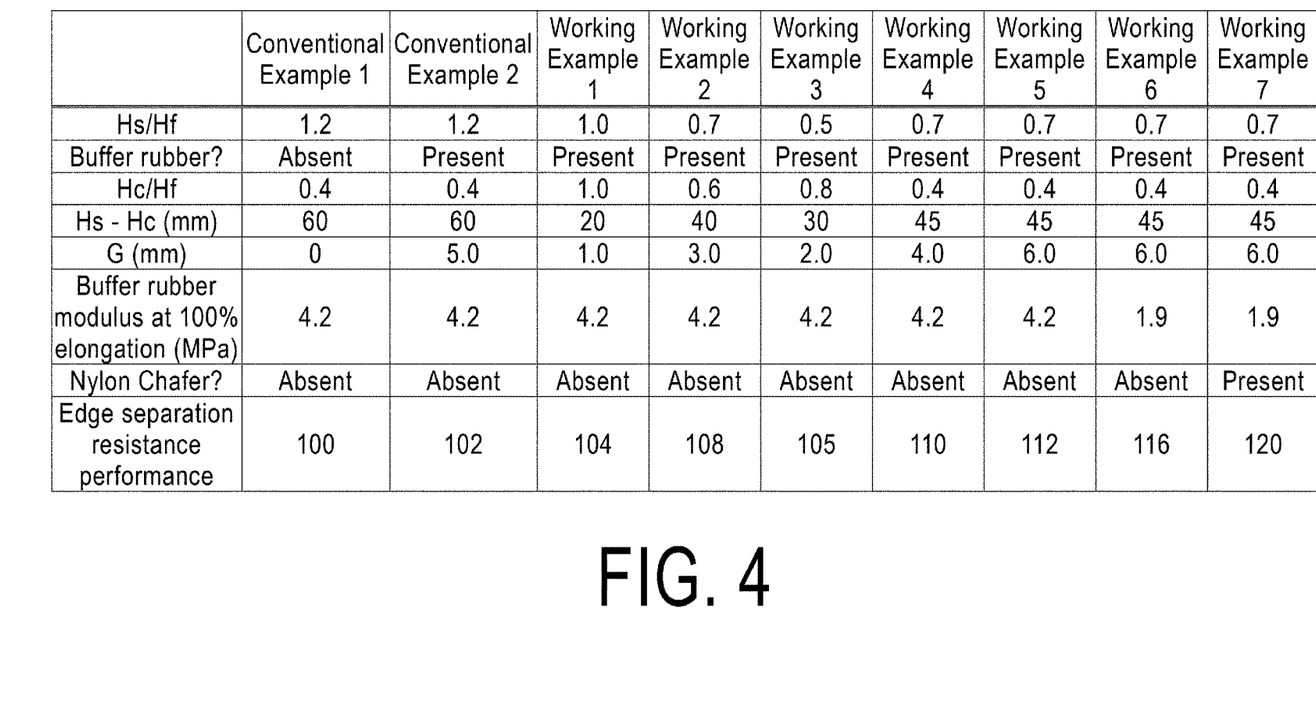
FIG. 4 is a table showing results of performance testing of the pneumatic tire according to the embodiment of the technology.

FIG. 4 is a table showing results of performance testing of pneumatic tires according to the embodiment of the present technology.

In the performance testing, a plurality of different test tires were evaluated for edge separation resistance performance. Test tires with a tire size of 1400R24 ID were assembled on an applicable rim defined by JATMA (10.00 WI), inflated to an air pressure of 700 kPa, and loaded with 9570 kg weight.

A low pressure endurance test was performed using an indoor drum tester. The running speed was set to 45 km/h, with the load being increased from the specified load by 5% every 12 hours, and the running time until the tire failed was measured. Evaluation was conducted using measurement results expressed as indices, the results of Conventional Example 1 taken as the reference value (100). In this evaluation, a larger value indicates preferable performance.

The test tires according to Working Examples 1 to 7 had the configuration illustrated in FIGS. 1 to 3. The pneumatic tire 1 was provided with the carcass layer 13, which includes the steel cords, and the steel chafer 21. In addition, the rim flange height Hf was set to Hf=51 mm. The steel cords of the steel chafer 21 had a diameter of 1.8 mm, an inclination angle with respect to the tire circumferential direction of 65 degrees, and the density at which the steel cords were disposed was 20 cords/5 cm. The test tire of Working Example 7 was provided with a pair of sub-chafers 22, 23 made of nylon fiber.

The test tires of Conventional Examples 1 and 2 had the same configuration as that of Working Example 1, except that the ratio Hs/Hf was in the range: 1.0<Hs/Hf. Additionally, the test tire of Conventional Example 1 was not provided with the buffer rubber 18.

As can be seen from the test results, the test tires of the Working Examples 1 to 7 demonstrated improved edge separation resistance performance of the tire.

The invention claimed is:

1. A pneumatic tire, comprising:
a pair of bead cores;
a pair of bead fillers disposed outward of the pair of bead cores in a tire radial direction;
a carcass layer disposed folded around the bead cores and the bead fillers;
a steel chafer including an arranged plurality of steel cords, the steel chafer being disposed between the carcass layer and a rim engaging surface, wherein the steel cords that constitute the steel chafer have a diameter of from 1.0 mm to 3.0 mm, both inclusive, an angle formed by a longitudinal direction of the steel cords and the tire radial direction is from 50 degrees to 75 degrees, both inclusive, and a density at which the steel cords are disposed is from 10 cords/5 cm to 40 cords/5 cm, both inclusive;
a plurality of sub-chafers made of organic fiber material, the plurality of sub-chafers being disposed covering an outer end portion of the steel chafer from an outer side in a tire width direction; and
a buffer rubber disposed between the carcass layer and the outer end portion of the steel chafer; wherein
the pneumatic tire is a heavy duty tire;
only one sub-chafer of the plurality of sub-chafers covers an outer end portion of the steel chafer on an inner side in the tire width direction;
a height Hs of an outer end portion of the steel chafer located outward of the bead fillers in the tire width direction and a rim flange height Hf have a relationship: $0.5 \leq Hs/Hf \leq 1.0$, where the height is measured from a measuring position of a rim diameter;
a height Hc of an inner end portion of the buffer rubber in the tire radial direction and the rim flange height Hf have a relationship: $Hc/Hf \leq 0.4$, where the height is measured from the measuring position of the rim diameter and the rim flange height Hf is a difference in height between a maximum diameter of a rim flange portion of a specified rim and a rim diameter of the specified rim;
the rim engaging surface has a concave portion configured to be fitted to the rim flange portion in a region from an inner end portion of the buffer rubber to the outer end portion of the steel chafer;
the steel chafer is wound up together with the carcass layer, surrounding an folded portion of the carcass layer from an inner side in the tire radial direction;
a wound up end portion of the steel chafer located inward in the tire width direction extends outward in the tire radial direction than the bead core;
a wound up portion of the carcass layer is located further to an outer side in the tire radial direction than an outer end portion of the buffer rubber in the tire radial direction; and
a rubber gauge G from the carcass layer to the outer end portion of the steel chafer is in a range $5.0 \text{ mm} \leq G$.

2. The pneumatic tire according to claim 1, wherein a difference Hs–Hc between the height Hs of the outer end portion of the steel chafer and a height Hc of an inner end portion of the buffer rubber in the tire radial direction is in a range: $45 \text{ mm} \leq Hs-Hc$.

3. The pneumatic tire according to claim 2, wherein the buffer rubber has a modulus at 100% elongation of from 2.0 MPa to 4.0 MPa, both inclusive.

4. The pneumatic tire according to claim 3, wherein the steel chafer extends from a region outward of the bead filler in the tire width direction to a region inward from a center of gravity of the bead core in the tire width direction.

5. The pneumatic tire according to claim 1, wherein the buffer rubber has a modulus at 100% elongation of from 2.0 MPa to 4.0 MPa, both inclusive.

6. The pneumatic tire according to claim 1, wherein the steel chafer extends from a region outward of the bead filler in the tire width direction to a region inward from a center of gravity of the bead core in the tire width direction.

7. The pneumatic tire according to claim 1, wherein the height Hc of the inner end portion of the buffer rubber in the tire radial direction and the rim flange height Hf have the relationship: $Hc/Hf \leq 0.3$.

8. The pneumatic tire according to claim 1, wherein a height of the bead fillers extends radially outward of a tire maximum width position.

9. The pneumatic tire according to claim 1, wherein the plurality of sub-chafers cover the end of the steel chafer on the outer side in the tire width direction.

10. The pneumatic tire according to claim 1, wherein a majority of a height of the buffer rubber in the tire radial direction extends radially beyond a radially outermost end of the steel chafer.

11. The pneumatic tire according to claim 1, wherein the steel chafer extends to an inner side of the bead core in the tire width direction.

12. The pneumatic tire according to claim 1, wherein the wound up portion of the carcass layer extends further in the radial direction than the steel chafer.

13. A pneumatic tire, comprising:
a pair of bead cores;
a pair of bead fillers disposed outward of the pair of bead cores in a tire radial direction;
a carcass layer disposed folded around the bead cores and the bead fillers;
a steel chafer including an arranged plurality of steel cords, the steel chafer being disposed between the carcass layer and a rim engaging surface, wherein the steel cords that constitute the steel chafer have a diameter of from 1.0 mm to 3.0 mm, both inclusive, an angle formed by a longitudinal direction of the steel cords and the tire radial direction is from 50 degrees to 75 degrees, both inclusive, and a density at which the steel cords are disposed is from 10 cords/5 cm to 40 cords/5 cm, both inclusive;
a plurality of sub-chafers made of organic fiber material, the plurality of sub-chafers being disposed covering an outer end portion of the steel chafer from an outer side in a tire width direction; and
a buffer rubber disposed between the carcass layer and the outer end portion of the steel chafer; wherein the pneumatic tire is a heavy duty tire;

only one sub-chafer of the plurality of sub-chafers covers an outer end portion of the steel chafer on an inner side in the tire width direction;

a height Hs of an outer end portion of the steel chafer located outward of the bead fillers in the tire width direction and a rim flange height Hf have a relationship: $0.5 \leq Hs/Hf \leq 1.0$, where the height is measured from a measuring position of a rim diameter; a height Hc of an inner end portion of the buffer rubber in the tire radial direction and the rim flange height Hf have a relationship: $Hc/Hf \leq 0.4$, where the height is measured from the measuring position of the rim diameter and the rim flange height Hf is a difference in height between a maximum diameter of a rim flange portion of a specified rim and a rim diameter of the specified rim;

the steel chafer is wound up together with the carcass layer, surrounding an folded portion of the carcass layer from an inner side in the tire radial direction;

a wound up end portion of the steel chafer located inward in the tire width direction extends outward in the tire radial direction than the bead core;

a wound up portion of the carcass layer is located further to an outer side in the tire radial direction than an outer end portion of the buffer rubber in the tire radial direction; and a rubber gauge G from the carcass layer to the outer end portion of the steel chafer is in a range $5.0 \text{ mm} \leq G$.

14. The pneumatic tire according to claim 13, wherein a wound up end portion of the steel chafer located outward in the tire width direction extends further to an outer side in the tire radial direction than the wound up end portion of the steel chafer located inward in the tire width direction.

15. The pneumatic tire according to claim 13, wherein $0.5 \leq Hs/Hf \leq 0.8$.

16. A pneumatic tire, comprising:
a pair of bead cores;
a pair of bead fillers disposed outward of the pair of bead cores in a tire radial direction;
a carcass layer disposed folded around the bead cores and the bead fillers;
a steel chafer including an arranged plurality of steel cords, the steel chafer being disposed between the carcass layer and a rim engaging surface;

a plurality of sub-chafers made of organic fiber material, the plurality of sub-chafers being disposed covering an outer end portion of the steel chafer from an outer side in a tire width direction; and a buffer rubber disposed between the carcass layer and the outer end portion of the steel chafer; wherein the pneumatic tire is a heavy duty tire;

only one sub-chafer of the plurality of sub-chafers covers an outer end portion of the steel chafer on an inner side in the tire width direction;

a height Hs of an outer end portion of the steel chafer located outward of the bead fillers in the tire width direction and a rim flange height Hf have a relationship: $0.5 \leq Hs/Hf \leq 1.0$, where the height is measured from a measuring position of a rim diameter; a height Hc of an inner end portion of the buffer rubber in the tire radial direction and the rim flange height Hf have a relationship: $Hc/Hf \leq 0.4$, where the height is measured from the measuring position of the rim diameter and the rim flange height Hf is a difference in height between a maximum diameter of a rim flange portion of a specified rim and a rim diameter of the specified rim;

a wound up portion of the carcass layer is located further to an outer side in the tire radial direction than an outer end portion of the buffer rubber in the tire radial direction; and the steel cords that constitute the steel chafer have a diameter of from 1.0 mm to 3.0 mm, both inclusive, an angle formed by a longitudinal direction of the steel cords and the tire radial direction is from 50 degrees to 75 degrees, both inclusive, and a density at which the steel cords are disposed is from 10 cords/5 cm to 40 cords/5 cm, both inclusive.

17. The pneumatic tire according claim 16, wherein a rubber gauge G from the carcass layer to the outer end portion of the steel chafer is in a range $5.0 \text{ mm} \leq G$.

18. A tire-wheel assembly comprising a wheel with a specified rim and a heavy-duty pneumatic tire according to the pneumatic tire of claim 1, wherein the specified rim refers to an applicable rim defined by the Japan Automobile Tyre Manufacturers Association (JATMA), a design rim defined by the Tire and Rim Association (TRA), or a measuring rim defined by the European Tyre and Rim Technical Organization (ETRTO).

* * * * *